United States Patent [19]

Lassanske et al.

[11] 4,399,780
[45] Aug. 23, 1983

[54] SPARK ADVANCE CONTROL MECHANISM FOR DUAL FUEL ENGINE

[75] Inventors: George G. Lassanske, Oconomowoc; Arthur G. Poehlman, West Bend, both of Wis.

[73] Assignee: Outboard Marine Corporation, Waukegan, Ill.

[21] Appl. No.: 314,227

[22] Filed: Oct. 23, 1981

[51] Int. Cl.³ .............................. F02P 5/08; F02P 5/10
[52] U.S. Cl. .............................. 123/146.5 A; 123/525; 123/527; 123/406; 123/407
[58] Field of Search .............. 123/525, 527, 575, 576, 123/577, 578, 1 A, 1 R, 146.5 A, 407, 408, 410, 411, 415

[56] References Cited

U.S. PATENT DOCUMENTS

| | | | |
|---|---|---|---|
| 2,381,304 | 8/1945 | Merrill | 123/527 |
| 2,450,826 | 10/1948 | Chandler | 123/406 |
| 4,013,050 | 3/1977 | Lacre | 123/406 |
| 4,068,639 | 1/1978 | Cook | 123/525 |
| 4,129,104 | 12/1978 | Kawakami | 123/146.5 A |
| 4,159,013 | 6/1979 | Sawada et al. | 123/407 |
| 4,241,709 | 12/1980 | Schellmann et al. | 123/146.5 A |
| 4,335,697 | 6/1982 | McLean | 123/527 |
| 4,346,686 | 8/1982 | Wakita et al. | 123/407 |
| 4,369,751 | 1/1983 | Batchelor et al. | 123/527 |

*Primary Examiner*—Raymond A. Nelli
*Attorney, Agent, or Firm*—Michael, Best & Friedrich

[57] ABSTRACT

Disclosed herein is a spark advance control mechanism for an engine capable of being selectively operated on gaseous fuel and on liquid fuel.

3 Claims, 1 Drawing Figure

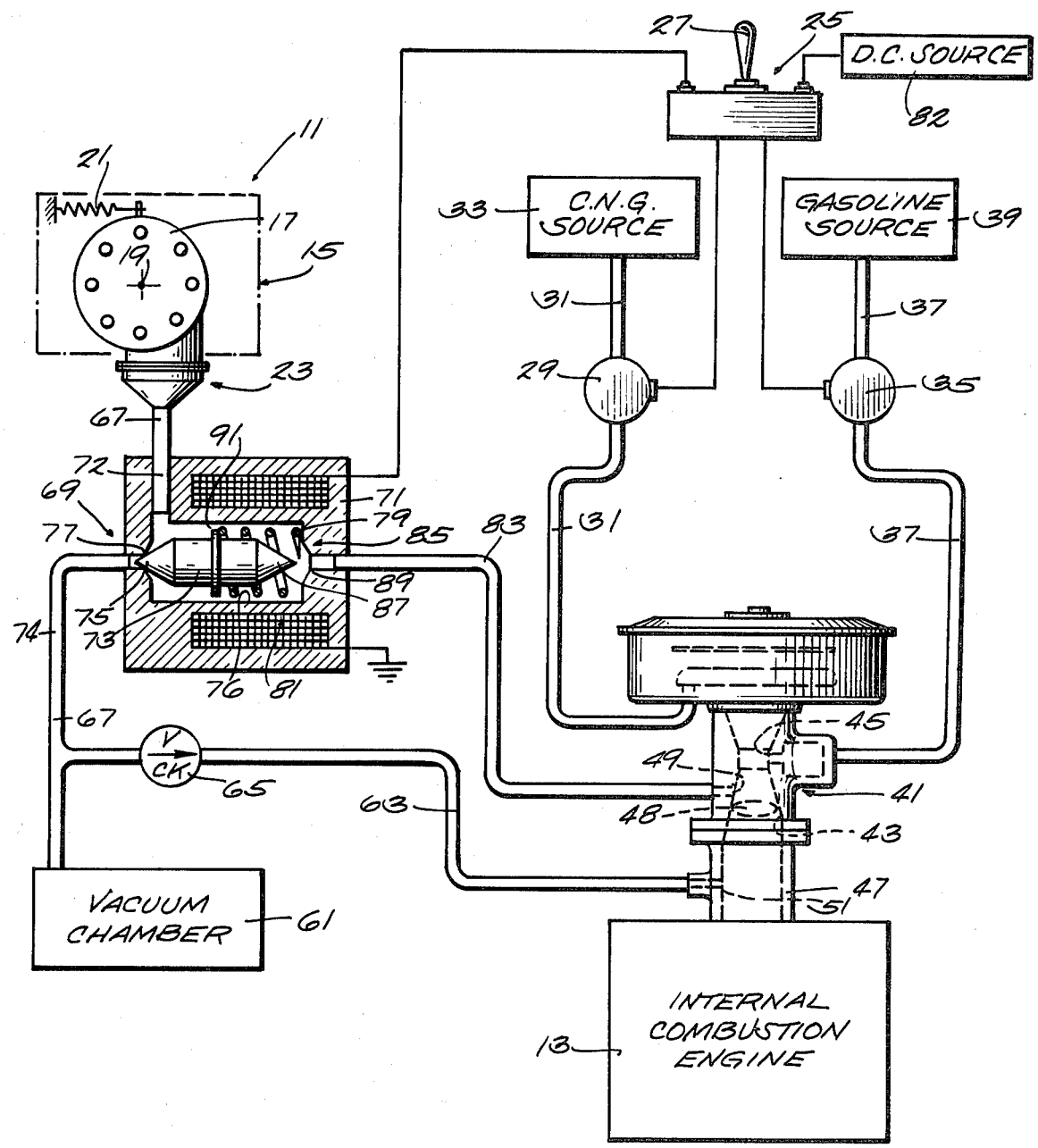

SPARK ADVANCE CONTROL MECHANISM FOR DUAL FUEL ENGINE

BACKGROUND OF THE INVENTION

The invention relates generally to selectively operating an internal combustion engine on two fuels, one of which benefits from ignition at a relatively advanced spark timing. The invention also relates to selectively operating an internal combustion engine on a gaseous fuel and on a liquid fuel. The invention also relates to arrangements for advancing the time of ignition when operating on a gaseous fuel, such as natural gas.

SUMMARY OF THE INVENTION

The invention provides a spark advance control mechanism for an engine capable of being selectively operated on a first fuel and on a second fuel, which system comprises an air induction passage having therein a movable throttle plate and communicating with the engine, a member electrically connected to the engine for timing of the sparking thereof and movable between a first position providing retarded sparking and a second position providing advanced sparking, means biasing the member for movement from the second position toward the first position, a vacuum actuated motor operable to displace the member from the first position toward the second position in response to application to the vacuum motor of an increasing amount of vacuum, a vacuum chamber, first conduit means communicating between the air induction passage downstream of the throttle plate for providing a vacuum in the vacuum chamber in response to engine operation and including check valve means affording fluid flow from the vacuum chamber to the manifold and preventing fluid flow from the manifold to the vacuum chamber, second conduit means communicating between the vacuum chamber and the vacuum motor and including first control valve means movable between a normally closed position and an opened position, third conduit means communicating between the air induction passage and the vacuum motor and including second control valve means movable between a normally opened position and a closed position, and operator controlled means connected to the first and second control valve means for opening the first control valve means and closing said second control valve means when the engine is operating on gaseous fuel, and for permitting closing of said first valve means and opening of said second valve means when the engine is operating on liquid fuel.

In one embodiment of the invention, the first and second control valve means comprise a housing defining an internal chamber communicating at one end with the second conduit means, communicating at a second end with the third conduit means, and communicating intermediate the second and third conduit means with the vacuum motor, a valve member located in the chamber for movement between first and second positions and including a first valve member end closing the second conduit means when said valve member is in the first position and a second valve member end closing the third conduit means when the valve member is in the second position, means biasing the valve member toward the first position, and means operable in opposition to the biasing means for displacing the valve member to the second position in response to actuation of the operator controlled means.

In one embodiment of the invention, the means for displacing the valve member to the second position comprises a solenoid coil, and the operator controlled means comprises a selector switch operable to connect the solenoid coil with a source of electrical energy.

Other features and advantages of the embodiments of the invention will become known by reference to the following general description, claims and appended drawings.

IN THE DRAWINGS

FIG. 1 is a schematic view of one embodiment of an arrangement for regulating the time of ignition sparking in an engine which is selectively operable between a gaseous fuel and a liquid fuel.

Before explaining one embodiment of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown schematically in the drawing is an ignition system 11 for an internal combustion engine 13, which system 11 includes a mechanism for suitably retarding and advancing the spark timing. In the illustrated construction, there is shown a distributor 15 including a movable member 17. While the disclosed construction is intended for use with an 8-cylinder internal combustion engine, the invention is not so limited and the movable member can be associated with any suitable ignition system for an engine having any number of cylinders.

The member 17 is movable between a retarded sparking position wherein sparking takes place at a relatively small interval from the time when the associated piston (not shown) is at top dead center and at an advanced position wherein the sparking takes place at a relatively large interval from the time when the associated piston is at top dead center. In the disclosed construction, the movable member 17 is rotated about its axis 19 between the retarded and advanced positions.

The distributor 15 includes means for yieldably moving or displacing the movable member 17 toward the retarded position. While various arrangements can be employed, in the illustrated construction, a spring 21 is employed to bias the member 17 in the direction toward the retarded position.

A vacuum operated motor or motor means 23 is provided for progressively displacing the movable member 17 against the action of the spring 21 in the direction from the retarded position to the advanced position in response to the application to the vacuum motor of a progressively increasing amount of vacuum. Thus, in the absence of a vacuum applied to the motor 23, the spring 21 will locate the movable member 17 in the retarded position. If a relatively small amount of vacuum is applied to the motor 23, the motor 23 will displace the movable member 17 somewhat in the direction from the retarded position to the advanced position, and if a relatively large amount of vacuum is applied to the motor 23, the motor 23 displaces the movable member 17 to the advanced position.

Means are provided for changing or shifting or controlling the fuel supply to the engine 13 from a first fuel which can be either a gaseous or a liquid fuel and which in the disclosed embodiment is a gaseous fuel such as natural gas, to a second fuel which can be either a gaseous or a liquid fuel, and which in the disclosed embodiment is a liquid fuel, such as gasoline, and vice-versa, and for controlling the position of the movable member 17 in accordance with the fuel being supplied to the engine 13. While various arrangements can be employed, in the illustrated construction, there is provided a fuel selector switch 25 which includes a fuel selector lever 27 movable between a first or natural gas position which electrically energizes a normally closed valve 29 in a supply line 31 between the engine 13 and a source 33 of the first fuel, natural gas, in the disclosed construction, thereby affording flow of natural gas to the engine 13, and a second or gasoline position which energizes a normally closed valve 35 in a supply line 37 between the engine 13 and a source of the second fuel, gasoline in the disclosed construction, thereby affording a flow of gasoline to the engine.

More specifically, the engine 13 includes a carburetor 41 having an air induction passage 43 which includes a venturi 45, which, downstream of the venturi 45, communicates with an intake manifold 47 communicating with the engine 13, and which, intermediate the venturi and the downstream end of the air induction passage 43, includes a throttle valve or plate 48 movable between opened and closed positions. Provided in the air induction passage 43, adjacent to the throttle valve 48, is a throttle valve port 49. Provided in the air induction passage 43, downstream of the throttle valve 48, or in the intake manifold 47, is another or manifold port 51.

Means are provided for displacing the movable member 17 to the advanced position in response to shifting of the fuel selector lever 27 to the natural gas position and in response to engine operation. While various other arrangements can be employed, in the illustrated construction, there is provided a vacuum chamber 61 which communicates through a conduit 63 with the manifold port 51 downstream of the throttle valve 48. The conduit 63 includes a check valve 65 permitting flow from the vacuum chamber 61 to the manifold 47 and preventing flow from the manifold 47 to the vacuum chamber 61. As a consequence, whenever the engine 13 has been operating, a relatively large amount of vacuum is developed and maintained in the vacuum chamber 61.

The means for displacing the movable member 17 to the advanced position when the fuel selector lever 27 is in the natural gas position also includes a conduit 67 communicating between the vacuum chamber 61 and the vacuum motor 23 and including valve means 69 which is normally biased closed and which is displaced to the opened position in response to actuation of the fuel selector lever 27 to the natural gas position. When the fuel selector lever 27 is in the natural gas position and the valve means 69 is opened, the relatively large amount of vacuum in the vacuum chamber 61 is applied to the vacuum motor 23 which causes displacement of the movable member 17 to the advanced position, and which maintains the movable member 17 in the advanced position.

While various other arrangements can be employed, in the disclosed construction the valve means 69 comprises a valve housing 71 which is interposed in the conduit 67 between a vacuum motor portion 72 and a vacuum chamber portion 74, and which includes an interior chamber 76 communicating with the conduit portions 72 and 74. In addition, the disclosed construction includes a movable valve member 73 which includes a portion of ferrous material, which is located in the interior chamber 76, and which, at one end, includes a needle-type point 75 which is normally urged by a spring 79 located within the housing against a valve seat 77 at the juncture of the conduit portion 74 and the interior chamber. Surrounding the valve chamber 76 is a solenoid coil 81 which, in response to movement of the fuel selector lever 27 to the natural gas position, is electrically connected to a source 82 of direct current so as thereby to displace the valve member 73, against the action of the spring 79, away from the valve seat 77, thereby placing the vacuum chamber 61 and vacuum motor 23 in communication.

Means are provided for displacing the movable member 17 between the retarded and advanced positions when the fuel selector switch 27 is moved to the second or gasoline position. Such movement deenergizes the solenoid coil 81 and thereby affords discontinuance of communication between the vacuum motor 23 and the vacuum chamber 61. While various constructions can be employed, in the illustrated construction, the housing chamber 76 communicates through a conduit 83 with the port 49 just upstream of the throttle valve 48. Alternatively, the conduit 83 can be connected to the manifold port 51 or to the conduit 63 in the area between the check valve 65 and the manifold port 51.

The conduit 83 includes valve means 85 operable to provide communication between the throttle port 49 and the vacuum motor 23 when the fuel selector switch lever is in the gasoline position and to prevent or close communication when the fuel selector switch 27 is in the natural gas position.

While other constructions can be employed, in the illustrated construction, the valve member 73 includes an opposite pointed end 87 which is movable relative to a valve seat 89 at the juncture of the conduit 83 with the valve housing chamber 86. The beforementioned spring 79 is operable between the wall of the housing chamber 76 and a slotted flange 91 on the valve member 73, which slotted flange 91 guides movement of the valve member 73 in the chamber 76, while the slotted condition permits communication of a vacuum condition at the port 49 to the vacuum motor 23 when the valve means 85 is open.

In operation, when the fuel selector switch 25 is in the gasoline position, the spring 79 biases the valve member 73 to the position closing the portion 74 of the conduit 67, thereby isolating the vacuum chamber 61 from the vacuum motor 23, and at the same time, opens the conduit 83, thereby communicating the vacuum motor 23 with the vacuum condition at the throttle port 49. As a consequence, the vacuum motor 23 senses the vacuum condition at the throttle port 49, which condition can range between a relatively large amount of vacuum when the throttle plate 48 is open, as for instance, when operating at high speeds, and a relatively small amount of vacuum when the throttle plate 47 is closed, as for instance, when operating at idle speed. Thus, when the fuel selector switch 25 is in the gasoline position, the movable member 17 is adjustably located within the range between retarded and advanced positions depending upon the vacuum condition at the throttle port 49.

During engine operation, a relatively large amount of vacuum is created and maintained in the vacuum chamber 61.

When the fuel selector switch 25 is displaced to the natural gas position, the solenoid coil 81 is electrically energized, thereby displacing the valve member 73 against the action of the spring 79 so as to close communication between the throttle port 49 and the vacuum motor 23 and so as to open communication between the vacuum chamber 61 and the vacuum motor 23. Consequently, as a relatively large amount of vacuum is maintained in the vacuum chamber 61, the vacuum motor 23 causes displacement of the movable member 17 to the advanced position when the engine 13 is being operated with natural gas.

Various of the features of the invention are set forth in the following claims:

We claim:

1. A spark advance control mechanism for an engine capable of being selectively operated on a first fuel and on a second fuel, said mechanism comprising an air induction passage having therein a movable throttle plate and communicating with the engine, a member electrically connected to the engine for timing of the sparking thereof and movable between a first position providing retarded sparking and a second position providing advanced sparking, means biasing said member for movement from said second position toward said first position, a vacuum actuated motor operable to displace said member from said first position toward said second position in response to application to said vacuum motor of an increasing amount of vacuum, a vacuum chamber, first conduit means communicating with said air induction passage downstream of such throttle plate for providing a vacuum in said vacuum chamber in response to engine operation and including check valve means affording fluid flow from said vacuum chamber to said manifold and preventing fluid flow from said manifold to said vacuum chamber, second conduit means communicating between said vacuum chamber and said vacuum motor and including first control valve means movable between a normally closed position and an open position, third conduit means communicating between said air induction passage and said vacuum motor and including second control valve means movable between a normally open position and a closed position, and operator controlled means connected to said first and second control valve means for opening said first control valve means and closing said second control valve means when the engine is operating on gaseous fuel, and for permitting closing of said first valve means and opening of said second valve means when the engine is operating on liquid fuel.

2. A spark advance control mechanism in accordance with claim 1 wherein said first and second control valve means comprise a housing defining an internal chamber communicating at one end with said second conduit means, communicating at a second end with said third conduit means, and communicating intermediate said second and third conduit means with said vacuum motor, a valve member located in said chamber for movement between first and second positions and including a first valve member end closing said second conduit means when said valve member is in said first position and a second valve member end closing said third conduit means when said valve member is in said second position, means biasing said valve member toward said first position, and means operable in opposition to said biasing means for displacing said valve member to said second position in response to actuation of said operator controlled means.

3. A spark advance control mechanism in accordance with claim 2 wherein said means for displacing said valve member to said second position comprises a solenoid coil and wherein said operator controlled means comprises a selector switch operable to connect said solenoid coil with a source of electrical energy.

* * * * *